July 18, 1939.      A. J. WARWICK      2,166,512
SPRAG DEVICE FOR VEHICLES
Filed July 7, 1937
Fig. 1.
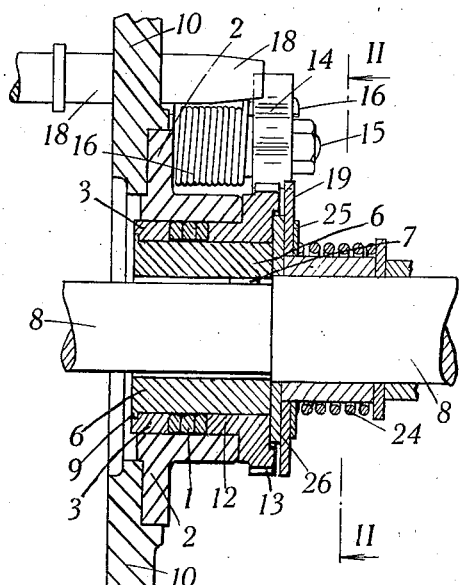
Fig. 2.
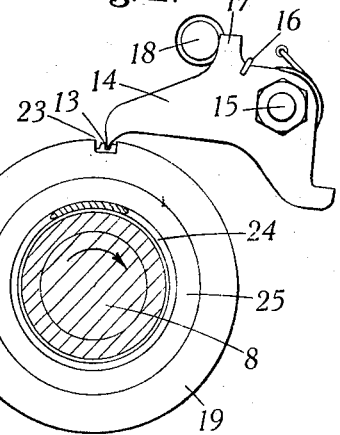
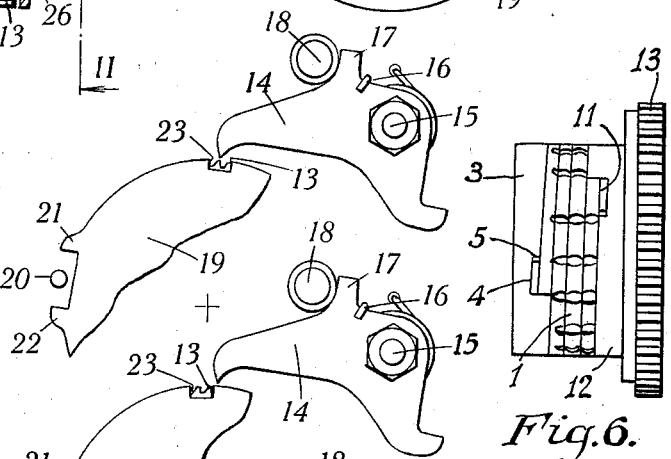
Fig. 3.
Fig. 6.
Fig. 4.
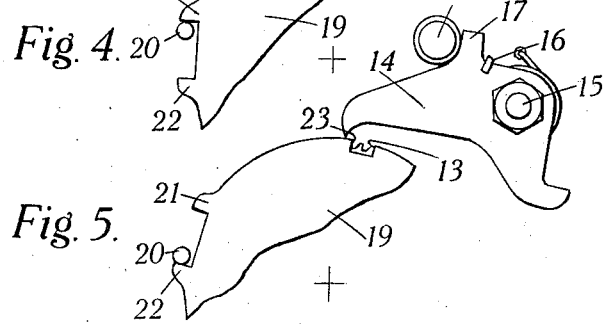
Fig. 5.
INVENTOR
Arthur Jack Warwick
BY
Darby & Darby
ATTORNEY Patented July 18, 1939

2,166,512

UNITED STATES PATENT OFFICE 2,166,512

SPRAG DEVICE FOR VEHICLES

Arthur Jack Warwick, London, England, assignor to Stancliffe Free-Wheeling Limited, London, England Application July 7, 1937, Serial No. 152,323
In Great Britain July 15, 1936

4 Claims. (Cl. 188—30)

This invention relates to sprag devices for vehicles.

There have been various proposals for the control of sprag devices on vehicles including one in accordance with which the sprag might be rendered inoperable and remain so, after subsequent backward movement of the vehicle, until a forward gear was engaged and the vehicle moved forward.

It is an object of the present invention to provide a modified form of sprag control, according to which it is not absolutely essential for a forward gear to be engaged to restore the sprag to operative condition after it has been rendered inoperative and backward movement has occurred.

It is a further object of the invention to provide an improved control arrangement for a sprag device of the coil spring type. In a particular arrangement in accordance with this aspect of the invention backward and forward movement of the car operates a friction device which moves a control member. The control member in its two extreme positions raises a detent or pawl from engagement with the teeth of a ratchet which will energize a coil-spring type of sprag when engaged by the detent or pawl as the car moves backward. For normal forward running the friction device holds the control member in its extreme forward position with the detent or pawl raised. Any backward motion of the car and therefore of the control member will then allow the detent or pawl to drop, engage the ratchet teeth and energise the sprag. To enable the car to reverse, the reverse control rod is arranged to raise the detent or pawl when reverse gear is engaged, and on reverse movement then taking place the control member moves to its other extreme position and holds the detent or pawl raised, even though the gear lever is meanwhile shifted, until the car again moves forward, when the detent or pawl will momentarily drag over the teeth of the ratchet and then resume its normal position for forward running. It will be noted that in this position the sprag is operative—that is capable of operation the moment the car moves back—and that it remains so until reverse gear is again engaged or until rendered inoperative by any special control which may be provided for this purpose, for instance to enable the car to be manœuvred in the garage.

With the above and other objects in view, the invention consists in the improved combinations and arrangements contained in the embodiments now to be described in detail, novel features of which are set out in the claims which follow.

In the drawing:

Figure 1 is a longitudinal section through the apparatus;

Figure 2 is a section on the line II—II of Figure 1, some parts being omitted, and Figures 3, 4 and 5 are similar views of part of the structure shown in Figure 2, the parts being shown in different positions in the several figures.

Figure 6 is an elevational view of the scroll and spring.

The sprag illustrated comprises a coil spring 1 which is arranged within a brake housing 2 and has one end anchored to a scroll 3 by means of a portion 4 which is received within a recess 5 in the scroll. The scroll 3 is keyed to a hub 6 which is splined, as at 7, to the gear-box main output shaft 8 and has a flange 9 against which the scroll 3 abuts.

The brake housing 2 is fixed to the end wall 10 of the gear-box by bolts or the like (not shown).

The other end of the spring 1 is anchored by means of a portion 11, to a scroll 12: this second scroll being integral with an energising ratchet 13, which is rotatably mounted on the hub 6.

The rotation of the shaft 8 is transmitted, through the scrolls 3 and 12 and spring 1, to the ratchet 13, so that these parts normally rotate together, there being slight clearance between the spring 1 and the inside of the housing 2.

A pawl 14 is mounted for pivotal movement upon a spindle 15, carried by the gear-box wall 10, and is urged by a spring 16 toward engagement with the teeth of the ratchet 13. In Figure 2, the direction of reverse rotation of the shaft 8 is indicated by an arrow and it will be evident that, with the parts in the relation illustrated by that figure, forward rotation of the shaft (and ratchet) will result in the pawl clicking over the teeth of the ratchet, whilst rotation of the ratchet in the direction corresponding to reverse rotation of the shaft 8 will be prevented by the engagement of the pawl with the reverse-facing teeth of the ratchet. When this occurs, continued backward movement of the vehicle causes the spring 1 to be expanded into locking engagement with the housing 2 to sprag the vehicle.

In order to allow the vehicle to be moved backward under power, provision is made whereby the sprag is rendered inoperative when reverse gear is engaged. For this purpose, an arm or abutment 17 on the pawl 14 is engaged by the frusto-conical end portion of the reverse-gear shift rod 18 which projects through a hole in the gear-box wall 10. Upon reverse gear being engaged, the shift rod 18 moves to the right from the position shown in Figure 1, the pawl 14 being raised, by cam action clear of the teeth of the ratchet, as shown in Fig. 3. The vehicle is then permitted to move backward without any spragging resulting.

In order to prevent the pawl chattering over the teeth of the ratchet when the vehicle is moving forward, and as part of the control in accordance with the invention, a control disc 19 is rotatably mounted on the shaft 8 and is capable of oscillating about the axis of the shaft between two extreme positions, which are determined by a stop member 20, which is carried by the housing 2 and engages between a pair of projections 21 and 22 from the circumference of the disc 19.

The pawl 14 is wide enough to rest upon the circumference of the disc 19, which is of greater diameter than the ratchet wheel and thus able to keep the pawl out of contact with the ratchet teeth. In order that the pawl may engage the ratchet teeth at the proper times, a recess 23 is provided in the circumference of the disc 19 and arranged to coincide with the pawl, permitting it to engage the ratchet teeth, when the disc 19 is in positions intermediate the two exereme positions. The disc is shown in such a position in Figures 2 and 3.

The control disc 19 is pressed by a light spring 24 between a pair of friction discs 25 and 26 which rotate with the shaft 8, and the control disc therefore tends to assume one of its extreme positions according to the direction of motion of the vehicle.

In normal forward running of the vehicle, the control disc 19 assumes the position shown in Figure 4 and keeps the pawl out of contact with the teeth. As soon as any backward movement takes place, the disc 19 returns to the position shown in Figure 2 and the pawl drops into engagement with the teeth to cause spragging.

Upon backward movement of the vehicle, after reverse gear has been engaged and the pawl raised to the position shown in Figure 3, the disc 19 assumes the position shown in Figure 5 and maintains this position throughout backward movement of the vehicle. When reverse gear is again disengaged the pawl does not immediately fall back into engagement with the ratchet teeth but remains resting upon the disc 19, no matter what gear shifts are made, until subsequent forward movement of the vehicle causes the disc to return to the position shown in Figure 2 whereupon the pawl is ready to arrest any backward movement of the ratchet and causes spragging or, upon continued forward movement, to drag momentarily over the teeth of the ratchet until again raised by the disc 19 taking up the extreme position shown in Figure 4.

It will be seen that except when reverse gear is engaged or any device provided to permit manœuvring in the garage is in action, the energiser is ready to act on the coil spring on backward car movement taking place at all times when the last car movement has been forward, without any direct mechanical linking of its mechanism with that for engaging a forward gear.

It will also be seen that backward movement under man-handling with the gear in neutral is possible, for instance for manœuvring in a garage, if the last movement of the vehicle before return of the gears to neutral has been a backward movement with reverse gear engaged; this possibility is solved, however, immediately upon any forward movement of the vehicle. If desired, a special garage or manœuvring device may be added, for example a device such as is described in our co-pending United States application No. 152,322, filed July 7, 1937, now Patent No. 2,151,250, dated Mar. 21, 1939.

I claim:

1. A sprag device for vehicles comprising a coil spring clutch operable to prevent backward movement of the vehicle, energizing means for said coil spring clutch including a detent, and friction means capable of operation by movement of the vehicle to maintain said detent in an inoperative position.

2. A sprag device for vehicles comprising a coil spring clutch operable to prevent backward movement of the vehicle, energizing means for said coil spring clutch including a detent, a rotary control member, a friction device operable upon backward or forward movement of the vehicle to cause said control member to oscillate between two extreme positions in each of which it maintains said detent in an inoperative position.

3. A sprag device for vehicles comprising a coil spring clutch operable to prevent backward movement of the vehicle, energizing means for said coil spring cluth including a detent, and a ratchet, a control member mounted concentrically with relation to said ratchet, and arranged to be frictionally controlled by backward or forward movement of the vehicle to oscillate between two extreme angular positions, said control member having a recess therein such that said detent is permitted to engage said ratchet when said control member is in positions intermediate its two extreme positions but is prevented from such engagement when said control member is in either of its extreme positions.

4. A sprag device for vehicles comprising a shaft, a coil spring clutch, including a coil spring and a fixed surface, one end of said coil spring being in driving engagement with said shaft, a ratchet in driving engagement with the other end of said coil spring, a detent capable of arresting said ratchet upon reverse movement of the vehicle to cause said coil spring to engage said fixed surface and sprag the vehicle by arresting said shaft, a disc mounted on said shaft for limited rotation between two extreme positions and having a recess such that it permits said detent to engage said ratchet when in an intermediate position but that prevents such engagement when in either of its extreme positions, and a pair of friction members mounted upon said shaft in engagement with opposite faces of said disc and capable of causing said disc to rock between its extreme positions in accordance with the direction of motion of the vehicle.

ARTHUR JACK WARWICK.